3,427,675
WINDSHIELD WIPER AND WASHER ASSEMBLY
James W. Tibbet, Rte. 1, Box 94, Gold Hill, Oreg. 97525
Filed July 3, 1967, Ser. No. 650,780
U.S. Cl. 15—250.04                                    8 Claims
Int. Cl. B60s 1/04; A47l 1/02

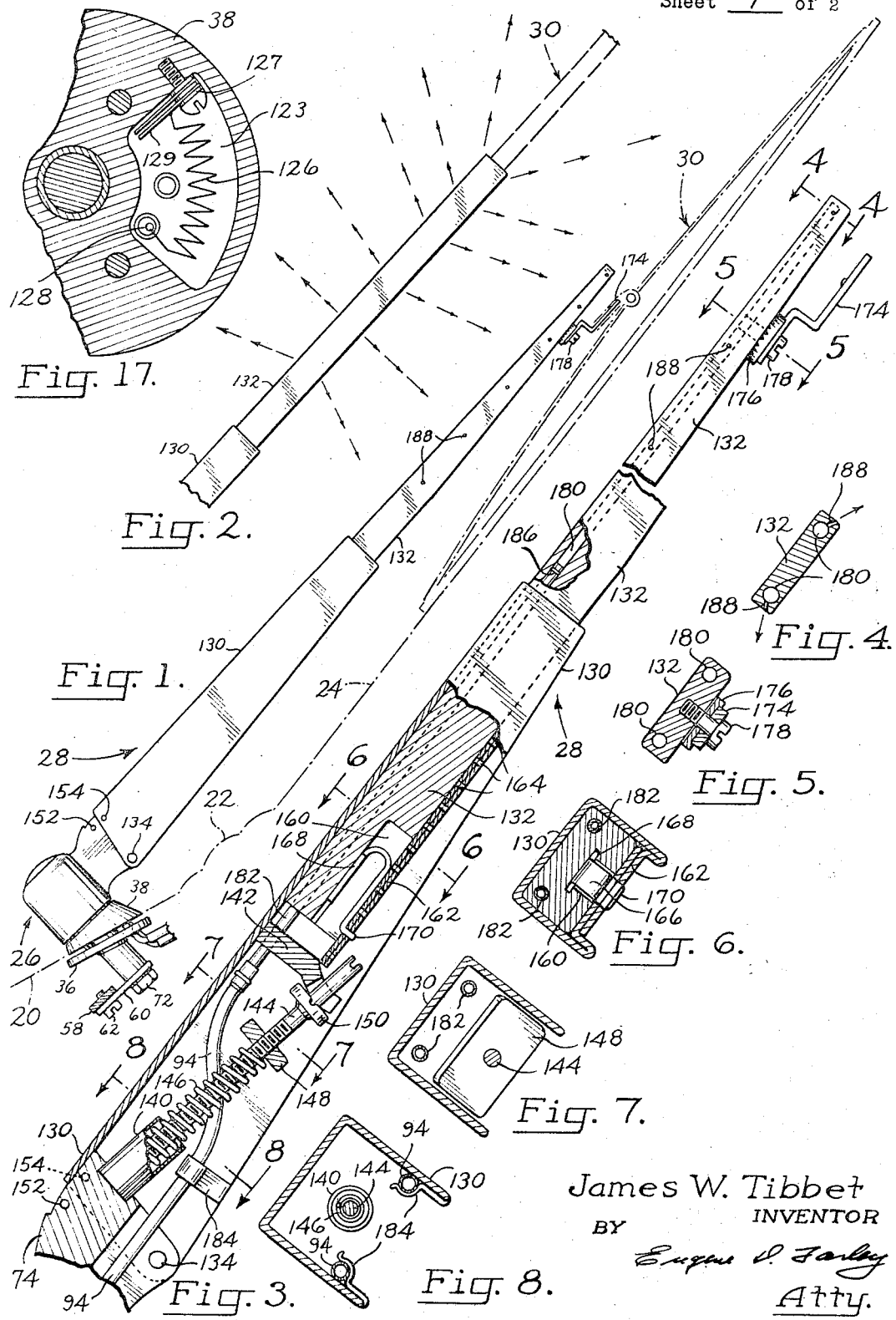

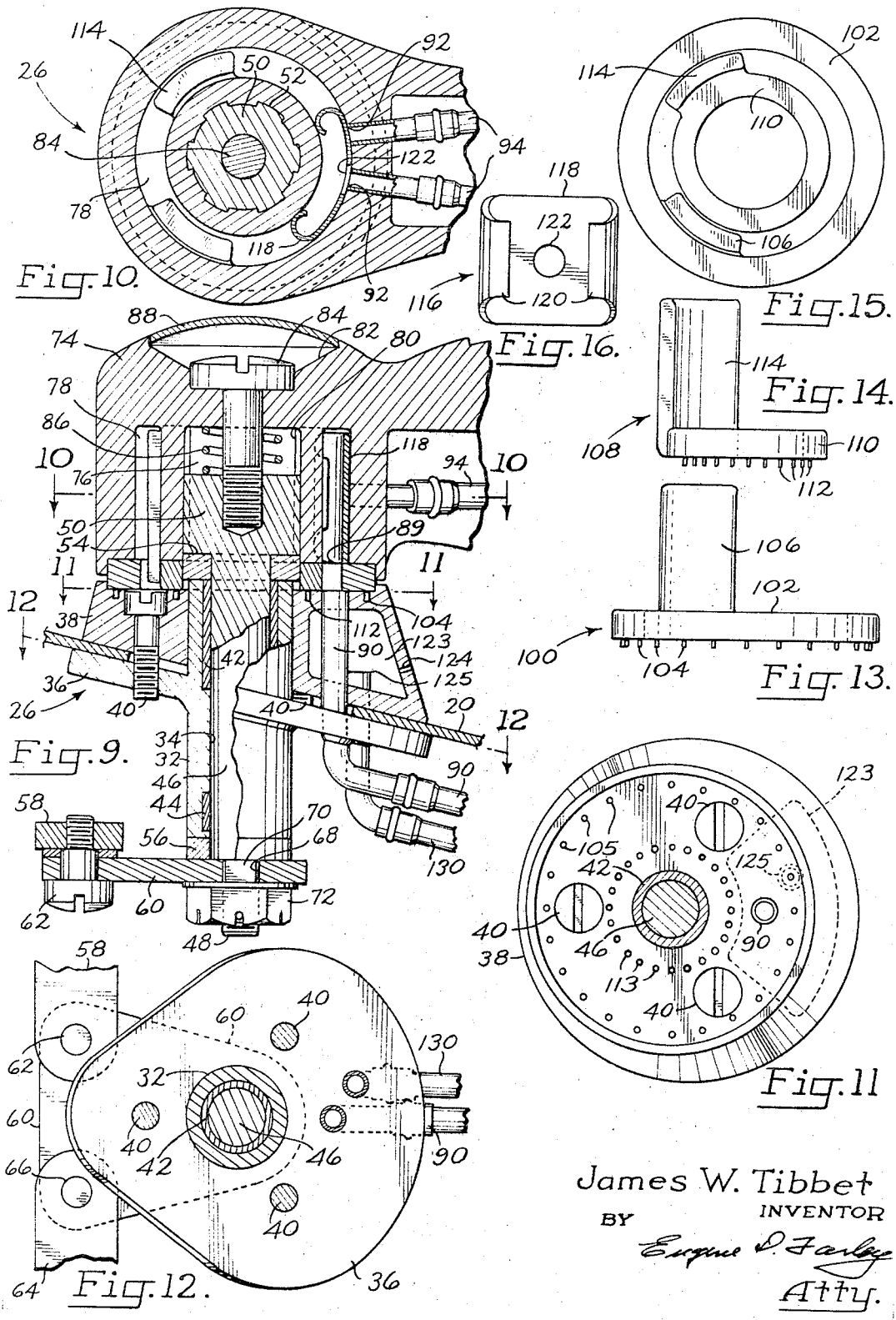

ABSTRACT OF THE DISCLOSURE

A windshield wiper and washer assembly comprises a base, a shaft mounted for oscillation in the base, and a wiper arm and blade attached to the shaft. The base contains a pressurized water chamber which communicates with a conduit extending the length of the arm. The conduit has spaced discharge ports along its length arranged to squirt water ahead of the wiper blade. Valve means in the head automatically control the flow of water so that it discharges first on one side of the blade and then on the other as required to apply it continuously ahead of the blade in the reversing motion of the latter.

---

This invention relates to windshield wiper and washer assemblies for automobiles and other vehicles.

Conventional windshield wipers and washers have a common deficiency in that, depending in part upon the speed of the vehicle, the flow of cleaning fluid from the washer is directed upon the windshield either above, below or behind the wiper blade. In extreme instances it may miss the windshield altogether.

In addition, in cold climates the washer assembly is subjected to freezing. These deficiences obviously cause inconvenience to the motorist, create a hazardous driving situation, and, in the case of freezing, clog and damage the wiper assembly.

Accordingly, it is the principal purpose of the present invention to provide a windshield wiper blade assembly fitted with a washer which directs the flow of cleaning fluid accurately and reliably directly ahead of the wiper blade on both of its oscillating strokes, thereby greatly increasing its efficiency.

It is another object of the invention to provide a combination windshield wiper and washer assembly provided with heating means so that it will not freeze in cold weather.

Still a further object of the present invention is the provision of a combination windshield wiper blade and washer assembly which is nearly maintenance free, and universal in its application to a variety of vehicles.

In the drawings:

FIG. 1 is a view in side elevation of the herein described windshield wiper assembly mounted on the cowl of a conventional vehicle adjacent the windshield;

FIG. 2 is a fragmentary view of the windshield wiper arm indicating the manner in which the washing water is discharged;

FIG. 3 is a fragmentary longitudinal view in section of the windshield wiper arm showing its interior construction;

FIGS. 4, 5, 6, 7 and 8 are transverse sectional views taken along lines 4—4, 5—5, 6—6, 7—7 and 8—8 of FIG. 3, respectively;

FIG. 9 is a sectional view of the base element of the windshield wiper assembly illustrating its interior construction and its manner of attachment to the vehicle;

FIGS. 10, 11 and 12 are transverse sectional views taken along lines 10—10, 11—11 and 12—12 of FIG. 9, respectively;

FIGS. 13 and 14 are separate detail views in elevation of adjustable cam elements incorporated in the base unit of FIGS. 9–11;

FIG. 15 is a plan view of the cam elements of FIGS. 13 and 14 in their assembled condition;

FIG. 16 is a detail view in elevation of a spring valve plate employed in base element of FIGS. 9–11; and FIG. 17 is a fragmentary sectional view illustrating heating means employed for preventing the freezing of the wiper assembly during cold weather.

In essence, the windshield wiper assembly of my invention includes a base attachable to the body of the vehicle, a wiper arm attached to the base and a wiper blade attached to the arm. A shaft is journaled in the base and linked for oscillating movement to the wiper motor of the vehicle. A head having a central water chamber is fastened to the upper end of the shaft.

An inlet port connects the chamber with a source of cleaning fluid under pressure and a discharge port connects the chamber with a conduit carried in the wiper arm. The conduit has discharge openings arranged to discharge fluid ahead of the wiper blade in both its passes.

Cam means mounted in the chamber operate valve means also mounted therein and arranged for supplying cleaning fluid to the wiper arm conduit as required to discharge the water first on one side of the blade and then on the other, thereby maintaining a supply of cleaning fluid always in front of the blade.

Considering the foregoing in greater detail and with particular reference to the drawings:

FIG. 1 illustrates the general construction of the herein described windshield wiper assembly and its manner of attachment to the vehicle.

The assembly is attached to the cowl 20 of the vehicle, adjacent molding strip 22 and windshield 24. It comprises essentially a base, indicated generally at 26, and an arm, indicated generally at 28. The latter is adapted to mount any of a plurality of commercially available wiper blades, indicated generally at 30.

The construction of base 26 is illustrated particularly in FIGS. 9 and 10.

The base includes an elongated bearing 32 having a bearing opening 34 longitudinally therethrough. The bearing is sufficiently long to extend through vehicle body member 20 and to project a substantial distance both above and below the latter. It is secured to the vehicle body by means of a plate 36 integral with the bearing and placed adjacent the undersurface of the body member, a washer-like spacing plate 38 of substantial thickness placed above the vehicle body member, and interconnecting screws 40. Bearing 32 is bushed with bushings 42, 44. It mounts for oscillating movement drive shaft 46 having a threaded lower end 48 and an enlarged head 50 formed with peripheral longitudinally arranged splines 52.

A water-tight gasket 54 is interposed between head 50 and the upper end of bearing 32. A thrust bearing 56 supports the lower end of drive shaft 46 which is connected to the wiper motor through linkages illustrated particularly in FIGS. 9 and 12.

One end of a connecting bar 58 is attached to the wiper motor, the other to a triangular crank plate 60 through the pivot pin 62. One end of a link 64 is connected to the opposite side of the crank plate by means of pivot pin 66. The other end of link 64 is connected to a companion wiper assembly, not illustrated.

The apex of the triangular crank plate 60 is provided with a squared opening 68 which receives a squared segment 70 of the lower end of drive shaft 46. A lock nut 72 secures the crank plate in its operative position.

Accordingly, the reciprocating drive transmitted through crank plate 58 causes drive shaft 46 to oscillate in short strokes, as required to operate the wiper arm and blade. This oscillatory movement is transmitted through a wiper head 74 of special design and function.

Head 74 is formed with a central recess 76 and an annular central chamber 78, coaxial with the recess. The enlarged upper end 50 of drive shaft 46 is received in recess 76 and is keyed to head 74 by means of splines 80.

Head 74 also is provided with a tapered opening 82 in its upper portion. This receives an adjustment bolt 84, the threaded end of which penetrates recess 76 and engages a tapped and threaded opening provided for this purpose in the enlarged upper end 50 of drive shaft 46.

A tensioning spring 86 is interposed between the ceiling of recess 76 and the upper end of drive shaft 46. A spring cap plate 88 seals off the top of the tapered recess and affords access to bolt 84 when tensioning adjustment is desired.

Chamber 78 of head 74 is provided with an inlet port 89 which communicates with a conduit 90 leading to a source of cleaning fluid under pressure, FIG. 9. Chamber 78 also is provided with a pair of radially spaced discharge ports 92. These communicate with a pair of discharge conduits 94, FIG. 10, which run the length of the wiper arm 28 as will appear hereinafter.

Chamber 78 also contains cam-operated valve means for directing the flow of cleaning fluid alternately through one or the other of discharge ports 92. The construction of these elements of the apparatus is shown particularly in FIGS. 13–16 inclusive. Their manner of application is shown in FIGS. 9 and 10.

The cam elements include a first cam indicated generally at 100, FIG. 13. It comprises a support plate 102 having downwardly extending seating pins 104. The latter seat in corresponding openings 105, FIG. 11, in the upper surface of plate 38 and enable radial adjustment of the cam element.

First cam 104 also includes a cam post 106 which extends upwardly into water chamber 78.

The companion cam, indicated generally at 108, includes a base 110 of somewhat smaller diameter than base 102 of cam 100. It nests within a central opening in the latter. It is provided with a plurality of downwardly extending spaced pins 112 which seat in corresponding openings 113 in the upper surface of plate 38 to enable adjustment of the cam.

Cam 108 also is formed with an integral upstanding cam post 114. Like cam post 116, it extends upwardly into water chamber 78 in the manner shown particularly in FIG. 15.

Water chamber 78 also contains a spring valve plate, indicated generally at 116, FIG. 16. The valve plate is interposed between cam posts 106, 114 and is actuable by the latter. It comprises a single piece of spring steel or other resilient material 118 having its opposite ends 120 of reduced width and reversely bent toward each other. It further is provided with a central opening 122.

When valve plate 116 is pressed into chamber 78 in the manner illustrated in FIG. 10, it bears against the opposite side walls of the chamber and thus is maintained in position, but slidably, with its valve opening 122 in alignment with discharge ports 92. It moves with the oscillating movement of head 74 until it comes into abutment with one or the other of cam posts 106, 114. These shift it back and forth to move valve opening 122 into registration with one or the other of discharge ports 92, thereby feeding cleaning fluid under pressure to one or the other of discharge conduits 94.

Means are present for heating the windshield wiper base assembly so that it will not freeze during cold weather. Two means for accomplishing this purpose are illustrated, one in FIG. 9 and the other in FIG. 17.

In the FIG. 9 embodiment, thick plate 38 is provided with a hot gas chamber 123 having a vent opening 124. A tube 125 feeds hot gas into chamber 123 from the exhaust manifold or other source of hot gas under pressure. The flow of hot gas through tube 125 is suitably valved and controlled so that it may be turned on when needed.

In the FIG. 17 embodiment, electrical heating means are employed.

Chamber 123 contains an electrical heating element 126 connected between terminals 127, 128. The terminals are in a suitable electric circuit with a control arranged so that the unit may be turned on or off when desired. The circuit may also include a thermostat 129 for thermostatic control.

Cleaning fluid under pressure discharged through conduits 94 is fed to one side or the other of wiper blade 30 by means of a wiper arm assembly illustrated in FIGS. 2–8 inclusive.

Wiper arm 28 preferably is of telescoping construction. It includes a hollow case 130, open on the bottom, which receives in nesting relation on elongated bar 132, of either solid or hollow construction.

Case 130 is pivoted at its lower, inner end corner to an extension of head 74 by means of a pivot pin 134. It is maintained resiliently in a position of exerting bearing pressure against the windshield by the compression spring assembly shown in FIG. 3.

Head 74 mounts a socket 140. Case 130 mounts a yoke support 142. One end of a spring pressed plunger 144 seats in socket 140, the other in the bifurcation of yoke 142.

The central section of plunger 144 is threaded. It mounts a compression spring 146, the compression of which is adjustable by means of nut 148. The upper end of plunger 144 mounts a notched stop 150 which bears against yoke 142. Hence, by suitable adjustment of the plunger assembly, the degree of pressure of the wiper blade on the windshield may be varied.

Means are provided for temporarily locking the wiper arm and blade in an elevated position in which they are separated from the windshield, when this is desired.

Such means, shown in FIGS. 1 and 3, comprise cooperating transverse openings 152, 154 located respectively in head 74 and casing 130. When the wiper arm is pivoted upwardly about pivot pin 134, these two openings register with each other so that a pin may be inserted to hold the arm in its raised position.

Means also are provided for adjustably maintaining the wiper arm in a selected position of longitudinal adjustment. For this purpose the inner end of bar 132 is provided with a longitudinal recess 160 which is T-shaped in cross section, FIG. 6. The floor 162 of case 130 is provided with a plurality of longitudinally spaced openings 164. A reversely bent spring 166 is inserted in recess 160 with its upper, enlarged end 168 wedged into T-shaped recess 160. The lower end of the spring is formed with a dog 170 dimensioned to enter openings 164.

Accordingly, to adjust the length of the telescoping arm, it is only necessary to collapse spring 168 by pressing against the end of dog 170, adjust the bar 132 relative to case 130 until it assumes the desired position and then guide dog 170 into the adjacent one of openings 164.

Means also are provided on bar 132 for attaching a conventional wiper blade.

In the form of the invention illustrated in FIG. 3, the attaching means comprise an angularly bent mounting arm 174 adjustably connected to bar 132 by means of a burred washer 176 and screw 178. The wiper blade 30 then may be connected onto the free end of arm 174 in conventional manner.

To provide a flow of water onto the windshield ahead of wiper blade 30 as it sweeps to and fro, bar 132 is formed with longitudinal bores 180. A pair of tubes 182 are mounted in the upstream portion of the bores. The inner ends of the tubes are coupled to the outer end of conduits 94, the central portions of which are supported in case 130 by means of clips 184.

The outer ends of tubes 182 are sealed with O-rings 186. Discharge ports 188 are arranged oppositely on opposite sides of the bar downstream from tubes 182. These direct the flow of cleaning fluid alternately to one side or the other so that it always will be ahead of the wiper blade.

*Operation*

The operation of the hereindescribed wiper apparatus as follows:

Water or other cleaning fluid under pressure is supplied under pressure through conduit 90 into chamber 78, FIG. 9. The windshield wiper motor is started. This reciprocates connecting link 58, FIGS. 9 and 12, and operates triangular crank plate 60 which transfers the drive through link 64 to a companion unit. Crank plate 60 oscillates drive shaft 46 which in turn oscillates connected head 74 to which arm 28 and wiper blade 30 are connected.

With the oscillation of head 74, spring valve plate 116 is shifted by cam posts 106, 114, FIG. 10, so that opening 122 in the valve plate alternately registers with one or the other of discharge ports 92. This effect is particularly apparent in FIG. 10, wherein all of the parts in cross section oscillate with the drive shaft, whereas cam posts 106, 114 remain stationary. They are held stationary by means of pins 104, 112 in the cam bases, which seat, respectively, in holes 105, 113 in stationary plate 38.

The cleaning fluid exhausted through one or the other of discharge ports 92 is conveyed via conduits 94, tubes 182, and bores 180 to discharge outlet 188. There it is directed in a stream against the windshield ahead of the wiper blade, as shown in FIG. 2, but on the leading side of the blade only on each of its strokes.

During cold weather the unit is prevented from freezing by means of heating chamber 126, FIG. 9, supplied with hot gas from the exhaust manifold through conduit 130. In the alternative, it may be kept from freezing by the thermostatic controlled electric heating element 132 of FIG. 17.

Thus it will be seen that by the present invention I have provided efficient apparatus for washing the windshields of vehicles which operates efficiently, which always provides a stream of water ahead of the wiper blade, and which may be kept from freezing during cold It is to be understood that the form of my invention herein shown and described is to be taken as an illustrative example of the same and that various changes in the shape, size and arrangement of parts may be resorted to without departing from the spirit of my invention or the scope of the subjoined claims.

Having thus described my invention, I claim:

1. A windshield wiper and washer assembly for vehicles equipped with a reversing windshield wiper motor, the wiper assembly comprising
   (a) a base having a bearing opening longitudinally therethrough,
   (b) means for attaching the base to the body of the vehicle ahead of the windshield,
   (c) an oscillating shaft journaled in the bearing opening,
   (d) link means connecting the lower end of the shaft to the windshield wiper motor,
   (e) a head having a central, annular water chamber supported on the upper end of the shaft,
   (f) fastening means releasably fastening the head to the shaft for oscillating movement of the head.
   (g) inlet port means connecting the chamber with a source of cleaning fluid under pressure,
   (h) discharge port means communicating with the chamber,
   (i) a wiper arm adapted to mount a wiper blade,
   (j) mounting means detachably mounting the arm on the head,
   (k) conduit means in the wiper arm communicating with the discharge port means,
   (l) discharge opening means communicating with the wiper arm conduit means and arranged to discharge fluid from the conduit means ahead of the wiper blade,
   (m) a pair of spaced apart cams in the chamber,
   (n) cam mounting means on the stationary base and
   (o) valve means positioned in the chamber for alternate opening and closing by the cam means upon oscillation of the shaft, thereby transmitting cleaning fluid into the conduit means.

2. The windshield wiper assembly of claim 1 wherein the cams comprise a pair of bases nesting one within the other, downwardly extending pins on each of the cam bases engaging the stationary base of the wiper assembly, and a pair of cam posts extending upwardly into the chamber, one on each side of the valve means.

3. The windshield wiper assembly of claim 1 wherein the valve means comprises a spring valve plate resiliently bearing against the opposite side walls of the chamber and provided with an opening registering with the discharge port means.

4. The windshield wiper assembly of claim 1 wherein the conduit means in the wiper arm comprises two parallel conduits extending substantially the length of the arm and provided with discharge ports directed on opposite sides of the wiper blade, the cams actuating the valve means to direct the flow of cleaning fluid alternately to one and then to the other of the conduits in the arm.

5. The windshield wiper assembly of claim 1 wherein the wiper arm is comprised of two telescoping sections, an outer case and an inner bar, the outer case having a plurality of openings along its length and the bar mounting a spring-pressed dog engageable with a selected one of the openings.

6. The windshield wiper assembly of claim 1 including heating means for heating the assembly.

7. The windshield wiper assembly of claim 6 wherein the heating means comprises a heating chamber in the base, an inlet duct communicating with the heating chamber and interconnecting it with a source of hot gas, and a discharge opening in the chamber for exhausting the gas therefrom.

8. The windshield wiper assembly of claim 6 wherein the heating means comprises a chamber in the base, an electric heating element in the chamber, and an electric circuit including the heating element for supplying electrical energy thereto.

References Cited

UNITED STATES PATENTS

| 2,168,202 | 8/1939 | Grantham | 15—250.04 |
| 2,528,979 | 11/1950 | Smulski | 15—250.2 |
| 2,677,143 | 5/1954 | Blaney | 15—250.06 |
| 2,763,023 | 9/1956 | Horton | 15—250.04 |
| 2,835,916 | 5/1958 | Mittag et al. | 15—250.04 |
| 3,234,579 | 2/1966 | Roscoe | 15—250.04 |

PETER FELDMAN, *Primary Examiner.*

U.S. Cl. X.R.

15—250.02, 250.05, 250.35